(12) United States Patent
Glasson

(10) Patent No.: US 9,234,735 B2
(45) Date of Patent: Jan. 12, 2016

(54) SYSTEM AND METHOD OF MANUFACTURE FOR A LINEAR POSITION SENSOR

(71) Applicant: Control Products, Inc., East Hanover, NJ (US)

(72) Inventor: Richard O. Glasson, Morris Plains, NJ (US)

(73) Assignee: Control Products, Inc., East Hanover, NJ (US)

(*) Notice: Subject to any disclaimer, the term of this patent is extended or adjusted under 35 U.S.C. 154(b) by 0 days.

(21) Appl. No.: 14/406,693

(22) PCT Filed: Jun. 4, 2013

(86) PCT No.: PCT/US2013/044106
§ 371 (c)(1),
(2) Date: Dec. 9, 2014

(87) PCT Pub. No.: WO2014/003992
PCT Pub. Date: Jan. 3, 2014

(65) Prior Publication Data
US 2015/0184990 A1    Jul. 2, 2015

Related U.S. Application Data

(60) Provisional application No. 61/664,558, filed on Jun. 26, 2012.

(51) Int. Cl.
*G01D 11/24*    (2006.01)
*G01D 5/00*    (2006.01)
(Continued)

(52) U.S. Cl.
CPC ............ *G01B 7/003* (2013.01); *F15B 15/20* (2013.01); *F15B 15/283* (2013.01); *F15B 15/2892* (2013.01); *G01B 3/11* (2013.01); *G01D 11/245* (2013.01); *F15B 2201/31* (2013.01); *F15B 2201/515* (2013.01)

(58) Field of Classification Search
USPC .................................................. 73/431, 321
See application file for complete search history.

(56) References Cited

U.S. PATENT DOCUMENTS 7,117,740 B2 * 10/2006 Reinis ................. G01F 23/0023
73/149
7,168,313 B2    1/2007 Reinis et al.
(Continued)

FOREIGN PATENT DOCUMENTS

JP    11-336714    12/1999

OTHER PUBLICATIONS

The International Search Report and Written Opinion, issued on Aug. 23, 2013, in the corresponding PCT Patent Application No. PCT/US2013/044106.

*Primary Examiner* — Lisa Caputo
*Assistant Examiner* — Jamel Williams

(57) ABSTRACT

A linear position sensing system includes a sensor, a conduit and an enclosure. The sensor has a connector and a converting element, where the connector includes a first end attached to the converting element and a second end that passes through the conduit and is configured for attachment to a moveable element of an external device. The enclosure houses the sensor. The conduit includes a first end fitting that is attached to the enclosure and a second end fitting that is affixed at a port or other aperture of the external device. The second end of the connector is configured to be inserted in the port other aperture and attached to the moveable element without disassembly of the external device.

18 Claims, 10 Drawing Sheets

(51) Int. Cl.
*G01F 15/14* (2006.01)
*G01F 3/20* (2006.01)
*G01B 7/00* (2006.01)
*G01B 3/11* (2006.01)
*F15B 15/28* (2006.01)
*F15B 15/20* (2006.01)

(56) References Cited

U.S. PATENT DOCUMENTS

2010/0050863 A1* 3/2010 Wenker ............... F15B 15/2892 92/5 R
2010/0307233 A1* 12/2010 Glasson .................... F15B 1/08 73/168

* cited by examiner

SYSTEM AND METHOD OF MANUFACTURE FOR A LINEAR POSITION SENSOR

This application is a National Stage Application of PCT/US2013/044106 filed Jun. 4, 2013, which claims priority from U.S. Provisional Patent Application No. 61/664,558, filed on Jun. 26, 2012. The priority of both said PCT and U.S. Provisional Patent Application are claimed. Each of the prior mentioned applications is hereby incorporated by reference herein in its entirety.

BACKGROUND

Linear position sensors may be used in a wide variety of applications including, for example, hydraulic energy storage systems, hydraulic actuators, and other similar applications. A linear position sensing system that can be easily adapted to different types of external devices and that is resistant to harsh environments would be desirable.

SUMMARY

Briefly, aspects of the present disclosure are directed to a linear position sensing system and method of manufacturing a linear position sensing system. A linear position sensing system may include, for example, a sensor, a conduit and an enclosure. The sensor may include a connector and a converting element, where the connector includes a first end attached to the converting element and a second end configured for attachment to a moveable element of an external device. The enclosure may house at least a portion of the sensor. The conduit may include a conduit first end attached to the enclosure and a conduit second end fitting operable to affix the conduit to the external device. The connector may pass through the conduit.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above and other aspects of the present disclosure described herein are illustrated by way of example(s) and not limited by any of the accompanying figures.

BRIEF DESCRIPTION OF THE DRAWINGS

A more complete understanding of the present disclosure may be realized by reference to the accompanying figures in which.

The illustrative aspects are described more fully by the Figures and detailed description. The present disclosure may, however, be embodied in various forms and is not limited to specific aspects described in the Figures and detailed description.

DESCRIPTION

Reference will now be made in detail to exemplary aspects of the present disclosure, including the best modes contemplated by the inventors for carrying out aspects of the disclosure. Examples of these exemplary aspects are illustrated in the accompanying drawings. While the disclosure is described in conjunction with these aspects, it will be understood that it is not intended to limit the invention to the described aspects. Rather, the disclosure is also intended to cover alternatives, modifications, and equivalents as may be included within the spirit and scope of the disclosure as defined by the appended claims. In the following description, specific details are set forth in order to provide a thorough understanding of the present disclosure. Aspects of the present disclosure may be practiced without some or all of these specific details. In other instances, well-known aspects have not been described in detail in order not to unnecessarily obscure the present disclosure.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this disclosure belongs.

Unless otherwise explicitly specified herein, the drawings are not drawn to scale.

A linear position sensing system and method is disclosed. The linear position sensing system may be suitable for use in high-pressure, high-temperature, liquid-immersed, and other harsh mechanical environments. The linear position sensing system may be used to, for example, measure the position of moveable elements in a device separately provided and external to the sensor. The external device may be, for example, a hydraulic energy storage device (e.g., an accumulator), hydraulic actuator (e.g., cylinders), or other similar device.

Figure 1:
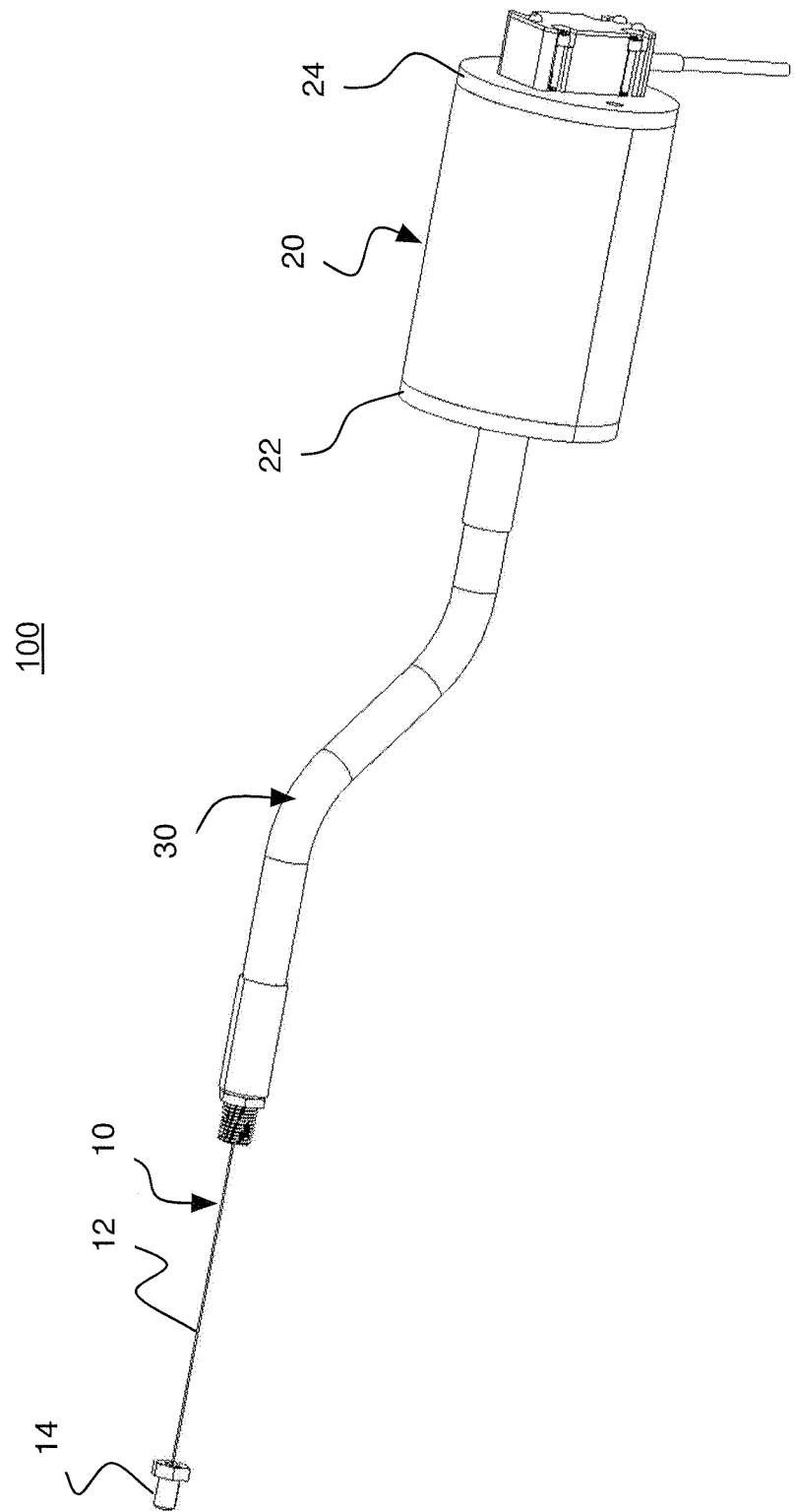
FIG. 1 depicts a linear position sensing system according to aspects of the present disclosure.

In FIG. 1, there is shown a linear position sensing system 100 according to aspects of the present disclosure. The linear position sensing system 100 may include a sensor 10 (for example, a draw-wire position sensor), an enclosure 20, and a conduit 30. The sensor 10 may also include a connector 12 (for example, flexible connector, sensor cable, cable, or draw-wire) and a converting element (discussed below and not shown in FIG. 1). The connector 12 may be attached (for example, removeably attached) to a moveable element of an external device (not shown). The connector 12 may be preferably attached to a moveable element using a connector attachment element 14 (as further discussed below).

The enclosure 20 may house and/or enclose at least a portion of the sensor 10. The enclosure 20 may include a pressure vessel fabricated from metal (e.g., steel), plastic, or any other type of material. The enclosure 20 may be, for example, a pressure vessel operable to contain a gas and/or liquid at a substantially higher pressure than ambient pressure (for example, 5,000 pounds-per-square-inch (psi) or any other higher-than-ambient pressure).

The conduit 30 may be a flexible substantially cylindrical element (for example, a high pressure wire reinforced hose), a rigid substantially cylindrical element (for example, a rigid pipe, a metal pipe, or a Teflon lined tube), or other similar element. The rigid substantially cylindrical element may be straight, formed (for example, a curved pipe), or defined by any other shape.

Figure 2:
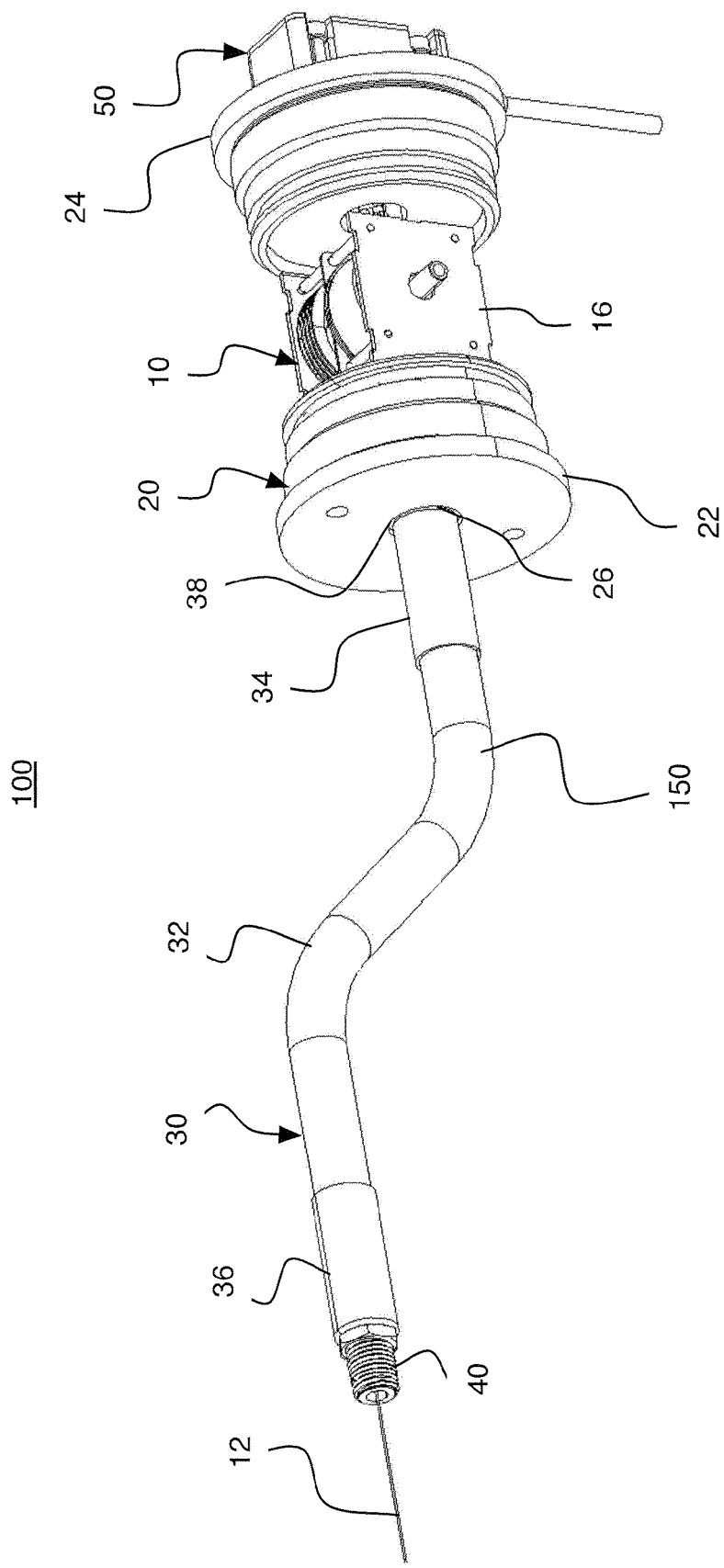
FIG. 2 depicts components of the linear position sensing system depicted in FIG. 1.

FIG. 2 further depicts the linear position sensing system according to FIG. 1. The sensor 10 may include a connector 12 and a converting element 16. The sensor 10 may be, for example, a draw-wire position sensor or any other type of position sensor. The sensor 10 may in particular be, for example, a precision sensor for a hydraulic cylinder (for example, as disclosed in U.S. Pat. No. 6,234,061 entitled "Precision Sensor for a Hydraulic Cylinder," which is incorporated by reference in its entirety) or any other suitable sensor. The connector 12 may be, for example, a flexible connector, a rigid connector, and/or any other type of connector. A flexible connector may include, for example, a metal cable, Kevlar cable, draw wire, nylon cable, or any other type of wire or cable. A flexible connector may be, in some aspects, a 7×7 braided steel cable with a 0.026-inch outer diameter. A rigid connector may be, for example, a metal rod, plastic rod, or any other type of rigid material. In some aspects, a connector 12 may include one or more flexible connector portions and one or more rigid connector portions.

In some aspects, a first end of the connector (not shown) may be attached and/or coupled to a converting element 16, and a second end of the connector 14 (for example, a connector attachment element) may be configured for attachment to a moveable element of an external device (for example, an accumulator, hydraulic actuator). The moveable element of the external device may, for example, translate relative to converting element 16, enclosure 20, conduit 30, and/or other components of the linear position sensing system 100. As the moveable element translates, the connector 12, which is attached to the moveable element, may, for example, be linearly displaced. The converting element 16, attached to the first end of connector 12, converts the displacement to an electrical signal representing the translation. The converting element 16 may, for example, generate an electrical signal proportional to an amount of displacement of the connector 12 and the moveable element. The electrical signal may be output by the sensor for further processing. The electrical signal may be output, for example, via an electrical fitting 50 (for example, a high-pressure electrical fitting) attached to the enclosure 20. The electrical fitting 50 may in particular be, for example, an electrical fitting as disclosed in U.S. Pat. No. 7,300,289, entitled "Electrical Cordset Having Connector with Integral Signal Conditioning Circuitry" or any other type of electrical fitting.

As discussed above, the enclosure 20 may be a pressure vessel. The enclosure 20 may include a first end cap 22, a second end cap 24, a cylindrical element (for example, a substantially cylindrical element shown in FIG. 1), and/or or other components. These components of the enclosure 20 may be sealably attached such that the enclosure 20 is operable to contain a gas or liquid at a substantially higher pressure than ambient when the conduit second end fitting is affixed to the external device. The enclosure 20 may, in some aspect, be substantially filled with and/or contain a non-combustible liquid or gas.

In some aspects, the converting element 16 of a sensor 10 may be affixed and/or attached to a first end cap 22, second end cap 24 and/or other components of the enclosure. The electrical fitting 50 may be attached to, for example, the second end cap 24 or another component of enclosure 20. The electrical fitting 50 may be sealably attached to the enclosure 20 (for example, to a second end cap 24 or another component) such that the electrical fitting 50, enclosure 20 and the attachment between the two elements are operable to contain a gas and/or liquid at a substantially higher pressure than ambient pressure (for example, up to 5,000 pounds-per-square-inch (psi) or any other higher-than-ambient pressure). The sensor 10 may be electrically connected to an electrical fitting 50. Electrical connectors (for example, wires) from the sensor 10 to the electrical fitting 50 may, for example, pass through second end cap 24.

In some aspects, a conduit 30 may be fastened to the enclosure 20. The conduit 30 may include an inner element (shown in FIG. 3), an outer element 32, a first end fitting 34, a second end fitting 36, and/or possibly other components. The first end fitting 34 may include a first fastener 38 (for example, a fastening element) to attach, fasten, and/or affix the conduit first end fitting 34 to the enclosure 20 (for example, to first end cap 22 or another component). The first fastening element 38 may include, for example, one or more of a threaded fastener (for example, a threaded fitting), a flange, a weldment, and/or a magnet fastener. The conduit first end fitting 34 may be, for example, a high-pressure end connector. The first end fitting 34 may be sealably attached to the enclosure (for example, to first end cap 22) such that the enclosure 20 and conduit 30 are operable to contain a gas or liquid at a substantially higher pressure than ambient when the conduit second end fitting 36 is affixed to an external device. The conduit second end fitting 36 may include a second fastening element 40 for fastening the conduit second end fitting 36 to an external device. The second fastening element 40 may be, for example, one or more of a threaded fasteners (as shown), a flange, a weldment, a clip, a clamp, and/or a magnetic fastener. The conduit second end fitting 36 may be, for example, a high-pressure end connector. The second end fitting 36 may, in some aspects, include an internal retainer for the inner element. The internal retainer may be operable to retain inner element within conduit 30.

In some aspects, the enclosure 20 may include an enclosure attachment element 26 operable to attach enclosure 20 and the linear position sensing system 100 to an external device. In this example, discussed in further detail below with reference to FIG. 5, at least a portion of the conduit 30 may extend into an external system and/or device.

Figure 3:
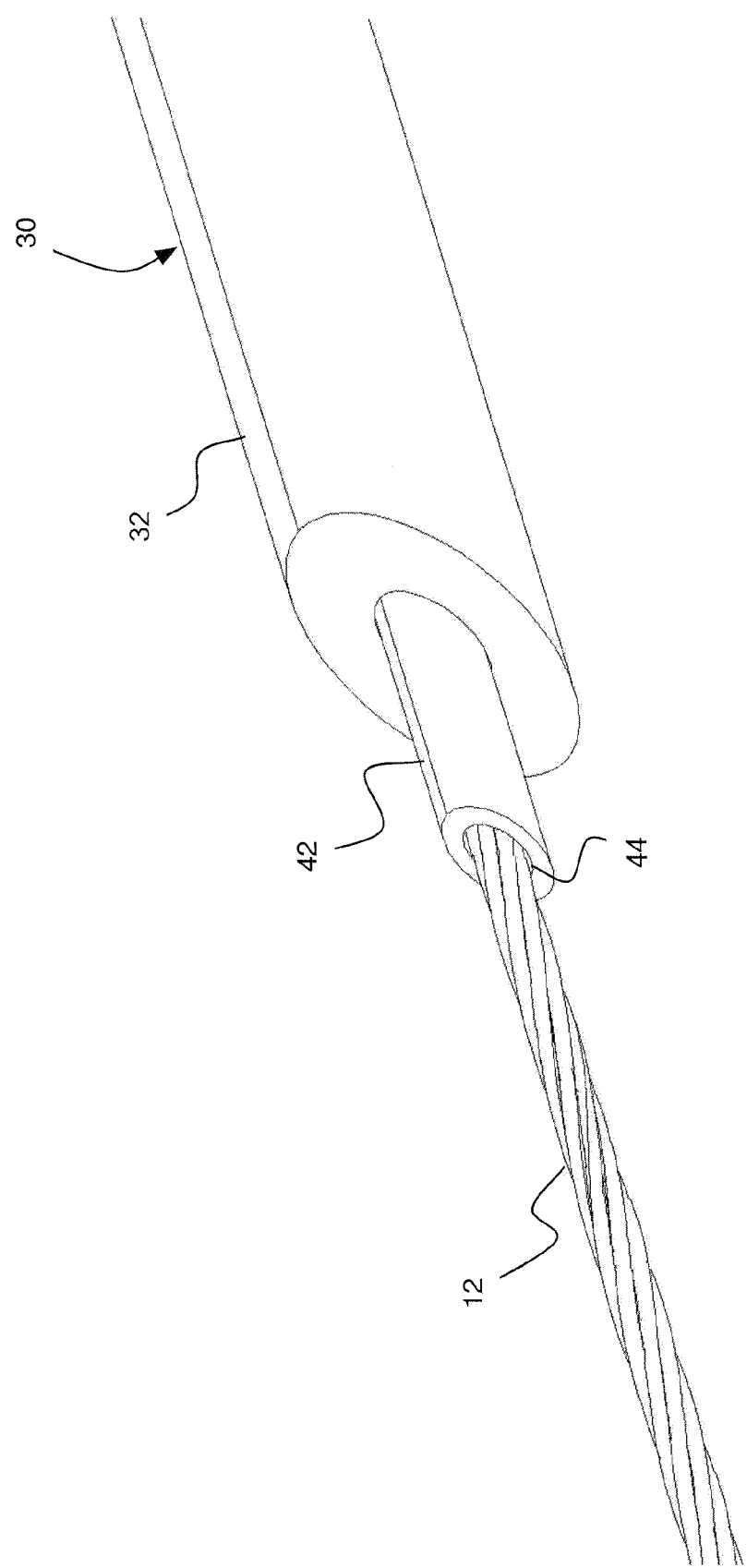
FIG. 3 depicts a cutaway view of a conduit and connector of a linear position sensing system according to aspects of the present disclosure.

FIG. 3 depicts a cutaway view of a conduit and connector of a linear position sensing system according to aspects of the present disclosure. In FIG. 3, the conduit 30 may include an inner element 42, an outer element 32, a first end fitting (not shown), a second end fitting (not shown), and/or possibly other components. The conduit inner element 42 may include at least an interior surface 44 formed from Teflon, fluorinated ethylene propylene (FEP) (for example, FEP hard plastic), an ultra-high-molecular-weight (UHMW) polymer, a fluoropolymer, a silicate surface coating, a low friction polymer, a polished metal and/or another material. The conduit inner element 42, including at least the inner surface 44, may be configured to reduce friction (for example, a friction load) applied to the connector 12. Connector 12 may, for example, pass through the conduit 30. The connector 12 may pass through the inner element 42 and may be in substantial contact with conduit inner element 42 (for example, the inner surface 44 of the inner element 42). The connector 12 may translate relative the conduit inner element 42 during operation the linear position sensing system 100.

In some aspects, the conduit 30 may be operable to permit fluid flow from an external device to the enclosure. Fluid may, for example, flow in a space defined between connector 12 and conduit inner element 42 and/or between inner element 42 and outer element 32. The space between the connector 12 and the conduit inner element 42 may be sufficient for fluid to flow from the external device to the enclosure 20. In some aspects, a difference between an outer diameter of the connector 12 and the conduit inner element 42 may be sufficient so that fluid flow through the conduit is not substantially impeded.

In some aspects, conduit outer element 32 may be a flexible substantially cylindrical element, a rigid substantially cylindrical element, or another element. The substantially cylindrical element may include, for example, a high-pressure wire reinforced hose, or other suitable flexible cylindrical element. The substantially cylindrical element may preferably include, for example, a heavy-duty hydraulic fluid hose including external steel braid or any other suitable hose. A rigid substantially cylindrical element may include, for example, a pipe, metal pipe, metal tube, or other suitable cylindrical element. Conduit outer element 32 may, for example, be formed and/or shaped to guide and/or route the connector 12 along a predetermined path (for example, around physical elements external to system 100). Conduit outer element 32 may be, for example, straight, formed (for example, a curved pipe), or defined by any other shape.

Figure 4:
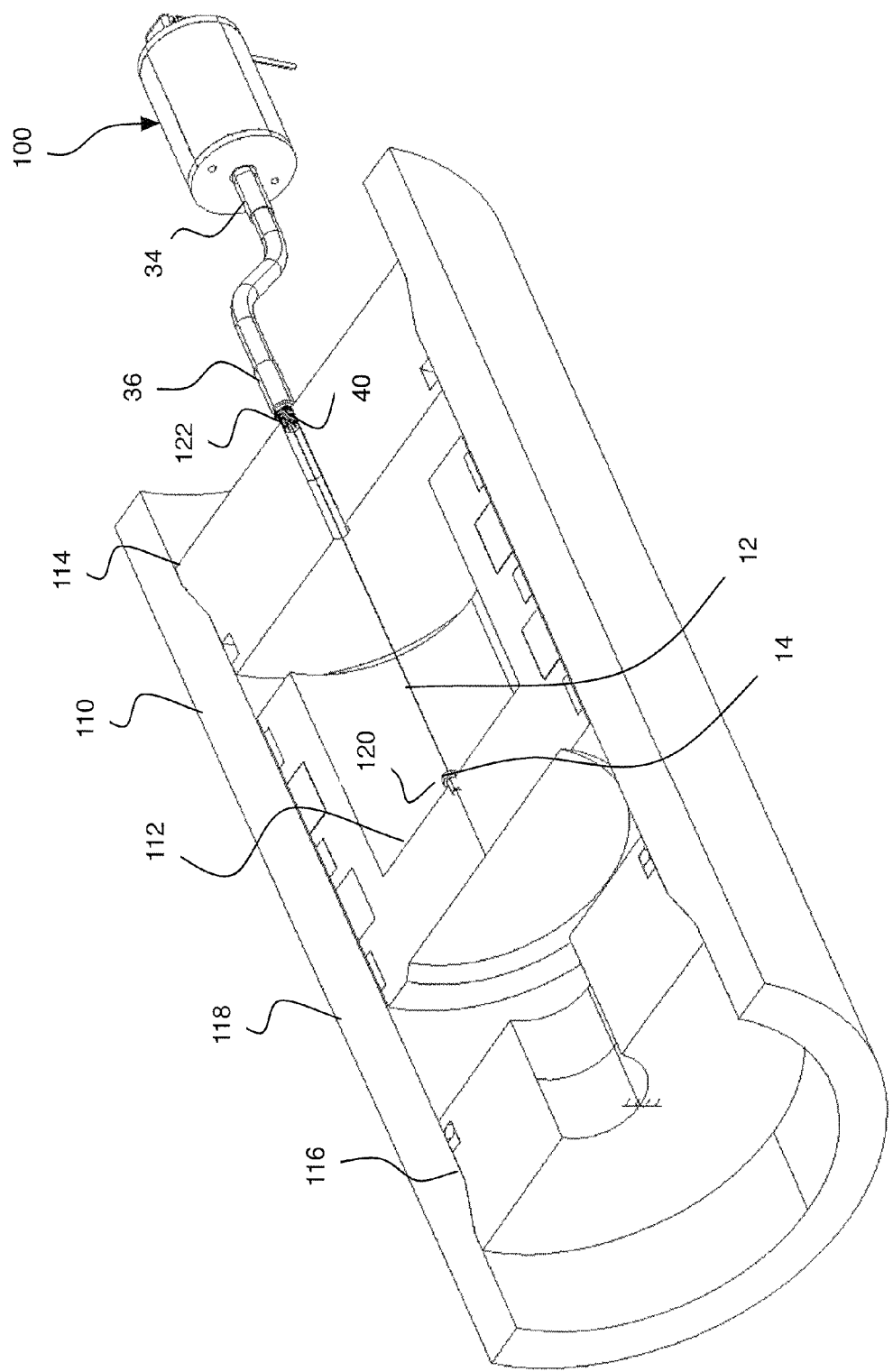
FIG. 4 depicts a cutaway view of linear position sensing system and external device according to embodiments of the present disclosure.

FIG. 4 depicts a cutaway view of a linear position sensing system 100 and external device 110 according to embodiments of the present disclosure. The linear position sensing system 100 may be operable to measure the position, translation, and/or linear displacement of a moveable element 112 of the external device 110. The external device 110 may be, for example, a hydraulic energy storage device (for example, an accumulator), a hydraulic actuator (for example, cylinders), or other device. The moveable element 112 may be, for example, an accumulator piston (as shown), a piston cylinder, or any other component.

In this example, the external device 110 (for example, an accumulator) may also include an accumulator first end cap 114 (for example, accumulator gas-side end cap), an accumulator second end cap 116 (for example, an accumulator oil-side end cap), an accumulator body element 118 (for example, an accumulator barrel), and/or other components. The accumulator first end cap 114, the moveable element 112 and the accumulator body element 118 may together house or contain gas (for example, air, an inert gas, high pressure gas, or any other type of gas) or another type of fluid. Similarly, the accumulator second end cap 116, moveable element 112 and accumulator body element 118 may house or contain a hydraulic liquid (for example, oil based hydraulic fluid, mineral based hydraulic fluid).

In some aspects, a linear position sensing system 100 may be attached (for example, removeably and/or sealably attached) and/or affixed to an external device 110. A connector attachment element 14 (for example, a connector second end) or other component of the sensor 10 may be attached to a moveable element 112 of external device 110. The moveable element 112 and the second end of the connector 14 may be attached to one another with one or more fastening elements including, for example a threaded attachment, a magnet (for example, a magnetic attachment), a spring clip, an adhesive, a spring-loaded detent (for example, a spring-loaded detent mechanism), a toothed expansion fastener, one or more leaf springs, and/or any other fastening elements. The second end of connector 14 may, for example, include a threaded fastener and the threaded fastener may be affixed to a fastener hole 120 provided in moveable element 112. The fastener hole 120 may be, for example, a threaded hole of a thread size corresponding to the threads of the second end connector fastener element. As discussed in more detail below, a second end connector attachment element 14 may be, in some aspects, a toothed expansion element and the toothed expansion element may be inserted into a hole 120 in the moveable element 112.

A conduit second end fitting 36 may be attached to, for example, a stationary component of an external device 110 (for example, the accumulator first end cap 114). The conduit second end fitting 36 may include a conduit second end fastening element 40. The conduit second end fastening element 40 may fasten and/or attach the conduit second end fitting 36 and conduit 30 to the external device 110. As discussed above, the conduit second end fastening element 40 may include one or more of a threaded fasteners (as shown) or any other element. The conduit second end fastening element 40 may, for example, include a threaded fastener and the threaded fastener may be affixed to a hole 122 (for example, a pass-through, threaded hole) included in the external device 110 (for example, an accumulator end cap 114). The fastener hole 120 may, for example, include threads of a size corresponding to the threads of the conduit second end element fastening element 40.

In some aspects, the pass-through 120 in the first accumulator end cap 114 may be, for example, a hole, fluid port, a #8 Society of Automotive Engineers (SAE) fluid port, or any other type of pass-through. In some aspects, an accumulator first end 114 may include a fitting (for example, a gas charge fitting, a high-pressure fuse fitting, and/or a pressure sensor fitting) operable to directly attach to the enclosure attachment element 26 of FIG. 2.

As previously described, the conduit second end fitting 36 may be, in some aspects, sealably attached and/or fastened to the external device 110 using the conduit second end fastening element 40. The second end fitting 36 and a component of external device 110 may be sealably attached such that the attachment may withstand high-pressure loads and/or differentials (for example, up to 5,000 psi). In some aspects, the external device 110 may include a fitting (for example, a gas charge fitting, a high-pressure fuse fitting, and/or a pressure sensor fitting) operable to attach to the conduit second end fitting 36. In some aspects, the attachment between second end fitting 36 and external device 110 may be operable to facilitate fluid to flow from external device 110 into conduit 30, enclosure 20, and other components of system 100. Fluid in the external device 110 may, for example, flow from inside a gas, hydraulic fluid or other fluid enclosure (for example, between moveable element 112 and first accumulator end cap 114 in an accumulator) through a pass-through in the first accumulator end cap 114, a conduit second end fitting 36, conduit 30, conduit first end fitting 34, enclosure 20, electrical fitting 50, and/or possibly other components. During operation of linear position sensing system 100, fluid may, for example, flow around and/or past the connector 12, the converting element 16, and other components of the sensor 10. This fluid flow may help to ensure that the linear position system 100 stays in place during operation and is not displaced as result of pressure differentials between the interior and exterior of external device 110.

Figure 5:
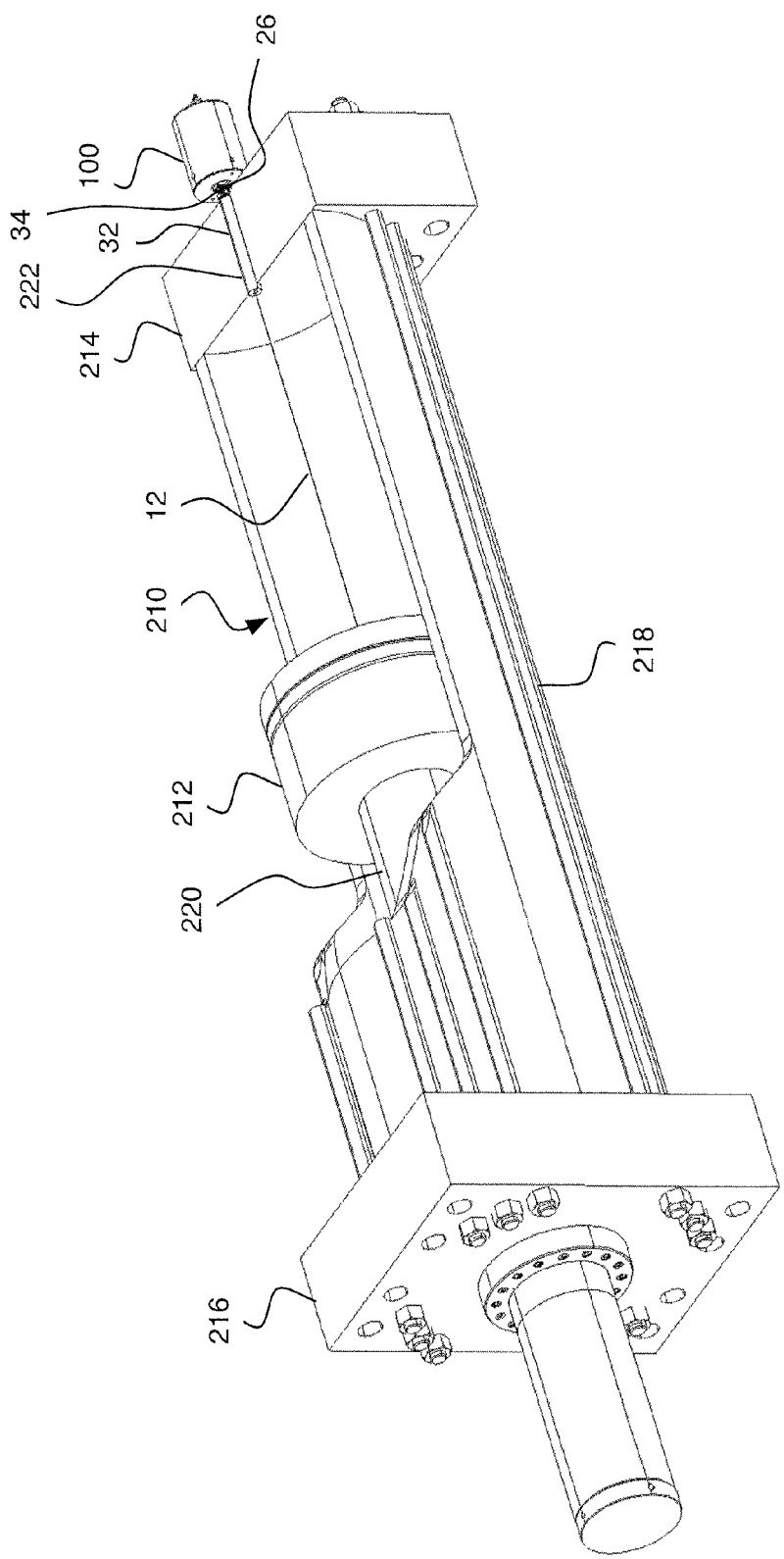
FIG. 5 depicts another cutaway view of linear position sensing system and hydraulic cylinder system according to aspects of the present disclosure.

FIG. 5 depicts a cutaway view of a linear position sensing system and hydraulic cylinder system according to aspects of the present disclosure. In this example, a hydraulic cylinder 210 may include a hydraulic cylinder piston 212 (for example, a piston), a hydraulic cylinder first end element 214 (for example, hydraulic cylinder first end cap), a hydraulic cylinder second end element 216 (for example, hydraulic cylinder second end cap), a hydraulic cylinder body element 218 (for example, cylinder barrel), a hydraulic cylinder piston rod 220, and/or other components. The hydraulic cylinder piston 212, hydraulic cylinder first end element 214, hydraulic cylinder body element 218 and/or other components may house or contain hydraulic fluid (for example, oil based hydraulic fluid, mineral based hydraulic fluid, or any other type of hydraulic fluid) or another type of fluid.

A linear position sensing system 100 is attached (for example, sealably and/or removeably attached) to the hydraulic cylinder 210. A second end of connector 14 or other component of the sensor 10 (not shown) is attached to the hydraulic cylinder piston 212 and/or piston rod 220 of the hydraulic cylinder 210. The second end of connector 14 may be attached with any of the fastener elements previously discussed in relation to the attachment between the second end of connector 14 and moveable element 112. Translation of hydraulic cylinder piston rod 220 and second end of connector 14, which is attached to the piston rod 220, may generate a representative electrical signal in sensor 10 of FIG. 2.

In the example of FIG. 5, a conduit 30 may include a substantially rigid conduit outer element 32 (for example, a metal pipe), a Teflon inner element, and possibly other components. An enclosure attachment element 26 of the linear position sensing system 100 may be attached to a stationary component (for example, a hydraulic cylinder first end cap 214) of hydraulic cylinder 210. The enclosure attachment element 26 may be, for example, a threaded fastener, a flange, a weldment, a clip, a clamp, and/or a magnetic fastener. In one example, enclosure attachment element 26 may be a threaded fastener and/or fitting that fastens to a threaded portion of the pass-through 222 in hydraulic cylinder first end element 214. The attachment between enclosure attachment element 26 and hydraulic cylinder first end element 214 may be a pressure sealed attachment. The enclosure attachment element 26 may be attached to a portion of a pass-through 222 in hydraulic cylinder first end element 214. The pass-through 222 may be, for example, a hole, fluid port, a #8 Society of Automotive Engineers (SAE) fluid port, or any other type of pass-through. In some aspects, hydraulic cylinder first end element 214 may include a fitting (for example, a gas charge fitting, a high-pressure fuse fitting, and/or a pressure sensor fitting) operable to attach to the enclosure attachment element 26.

In some aspects, at least a portion of the conduit 30 (for example, the conduit body 32 and/or conduit second end fitting 36) may extend through at least a portion of the pass-through 222 in the hydraulic cylinder 210. A connector 12 may extend from the conduit second end fitting 36 within the hydraulic cylinder 210 through a portion of hydraulic cylinder 210 including hydraulic fluid (for example, the portion enclosed by the cylinder piston 212, hydraulic cylinder body 218, and hydraulic cylinder first end element 214). Hydraulic fluid may flow from the hydraulic cylinder 210 past the connector 12 and into conduit 30. The hydraulic fluid may, for example, flow through a space between connector 12 and conduit inner element 42 and/or a space between the conduit inner element 42 and the conduit outer element 32 as illustrated in FIG. 3. The space between connector 12 and conduit inner element 42 may be sufficiently large that fluid flow past the connector 12 does not inhibit operation of sensor 10 and such that fluid flow from hydraulic cylinder 210 to enclosure 20 is not substantially inhibited and/or reduced.

Figure 6:
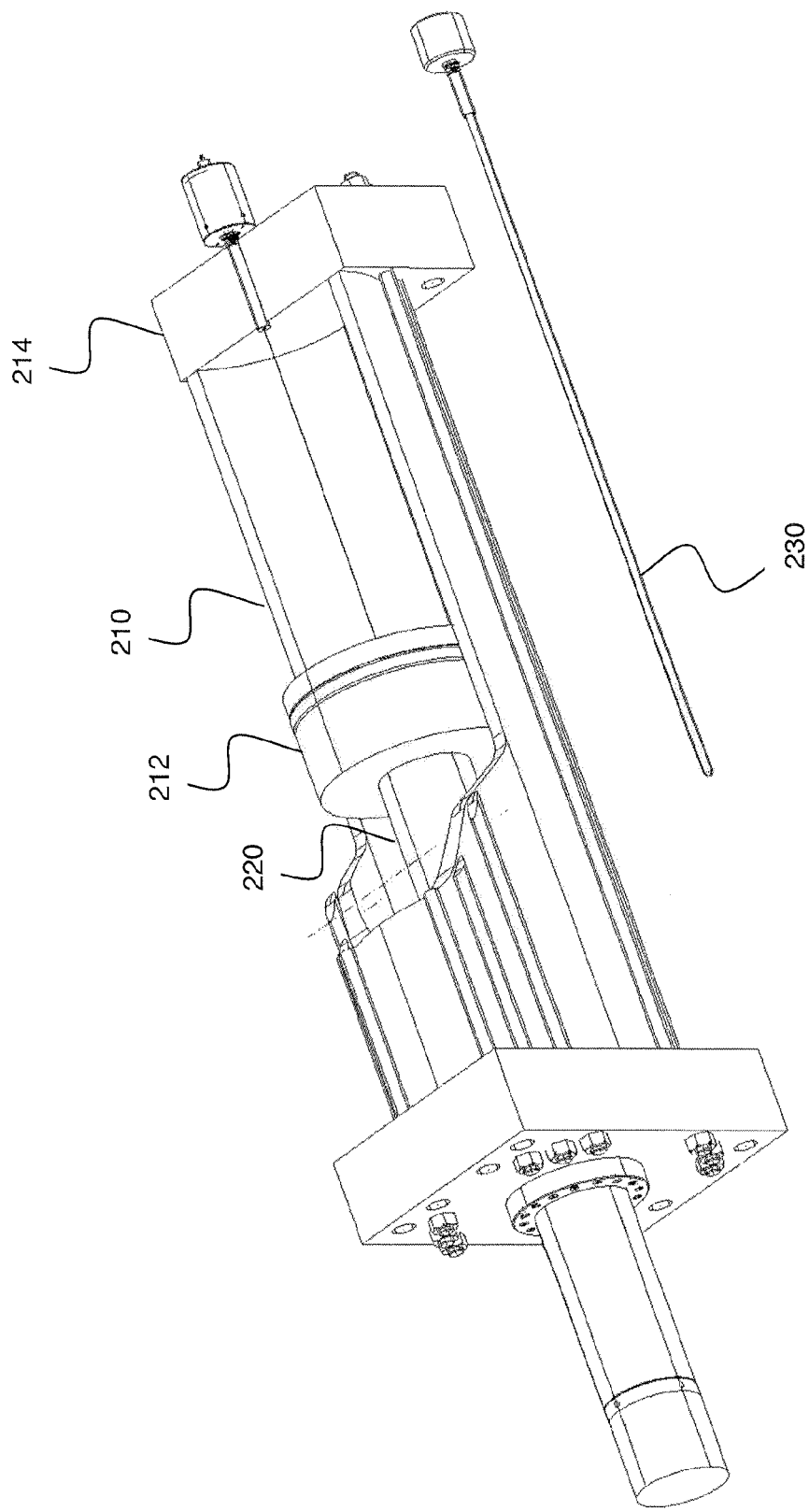
FIG. 6 depicts the linear position sensing system of FIG. 5 in use as a replacement sensor.

FIG. 6 depicts the linear position sensing system and hydraulic cylinder system 210 of FIG. 5. In a replacement activity, a prior art probe-type sensor 230 may be removed from the external device 210, and a linear position sensing system 100 may be provided and affixed to the external device 210. The linear position sensor 100 may be affixed to the hydraulic device by affixing the second end of the connector 14 of FIG. 1 the piston cylinder 212 or piston rod 220 of the hydraulic cylinder 210 and affixing an enclosure attachment fitting 26 to a stationary element 214 (e.g., a fluid port or other element) of the external device 210. The piston rod 220 may, for example, include a bore (for example, hole, pass-through) and/or other feature to accommodate the probe-type sensor 230. The second of the connector 14 may be attached to the bore in the piston rod 220 using a tooth expansion device, one or more leaf springs, a spring-loaded detent device, or any other fastening element.

Figure 7:
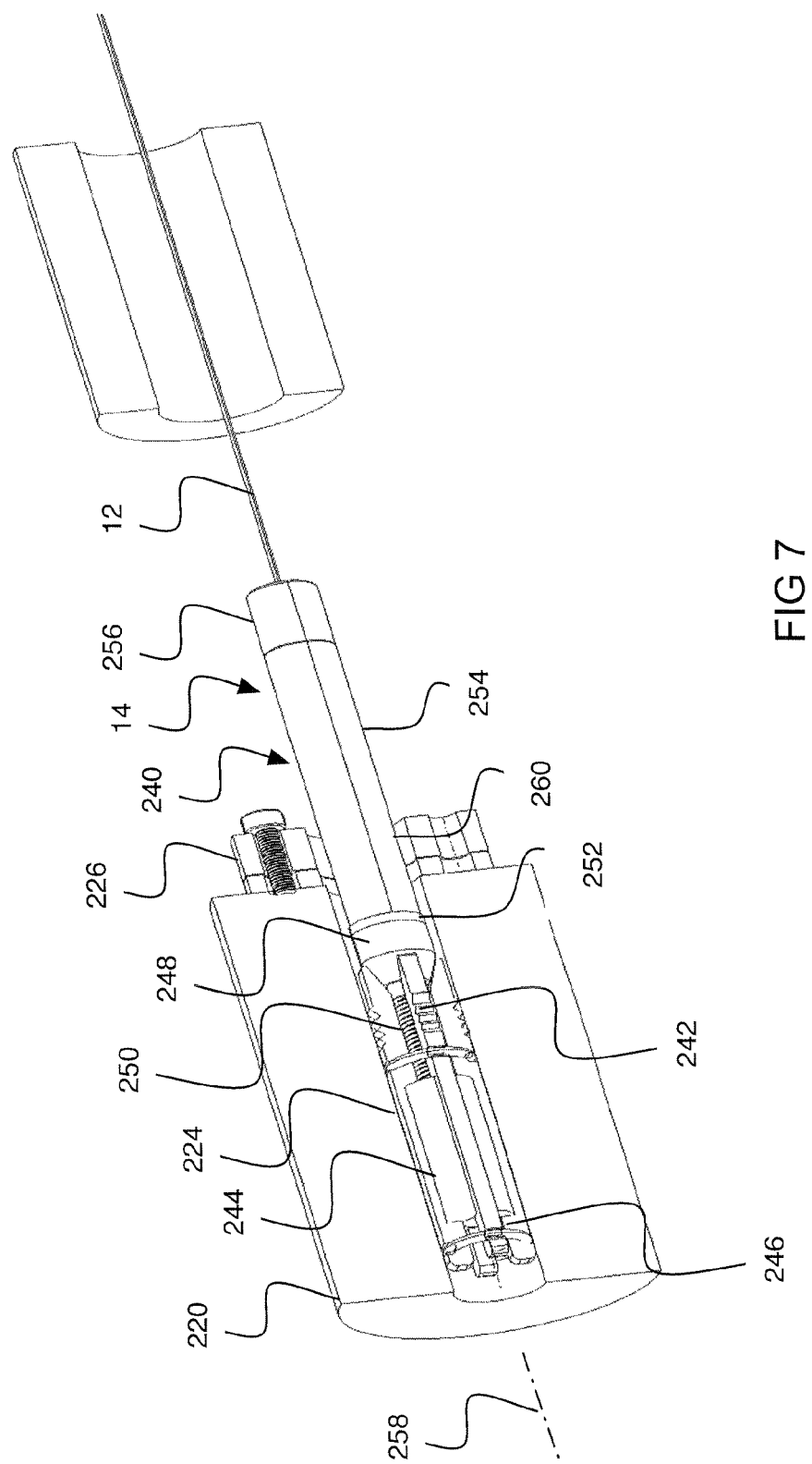
FIG. 7 depicts a toothed attachment element of a linear position sensing system and piston rod moveable element according to aspects of the present disclosure.

FIG. 7 depicts an attachment of a linear position sensing system and piston rod moveable element according to aspects of the present disclosure. A connector 12 (for example, as provided in the sensor 10 of FIG. 1) may be attached to a piston rod 220 (for example, a moveable element) using a connector attachment element 240. The connector attachment element 240 may be, for example, attached to the second end of the connector 14. In this example, the connector attachment element 240 may be a toothed expansion fastener as further described below.

In some aspects, a toothed expansion fastener may include one or more toothed arm elements 242, a slotted nut element 244 (for example including a threaded hole), one or more circular spring elements 246 (for example, o-rings), an expansion cone 248, a threaded engagement 250, a thrust washer 252, a toothed expansion fastener body 254, a socket element 256 (for example, an internal hex element), and/or other elements. The one or more toothed arm elements 242 may include teeth for gripping a surface of the piston bore hole 224. The circular spring element 246 may hold at least a portion of the toothed arm element 242 in substantial contact with the slotted nut element 244. The expansion cone 248 may be in substantial contact with the one or more toothed arm elements 242. The toothed expansion fastener body 256 may further include, for example, a compression spring (not shown), connector guided elements (not shown), a connector termination ferrule (not shown), and/or other elements. The toothed cable expansion fastener body 256 may attach connector 12 to the tooth expansion fastener 240.

The connector attachment element 240 may be inserted into a hole 224 (for example, a bore hole, pass-through) in piston rod 220. Upon insertion in the piston rod hole 224, a load and/or force as described further below may be applied to the toothed expansion fastener 240. The applied load may cause one or more toothed arm elements 242 in the toothed expansion fastener to engage, contact, grip, and/or substantially contact an inner surface of the piston rod 220 (for example, a surface defining the piston rod hole 224). The substantial contact between the teeth of the one or more toothed arm elements 242 of the toothed expansion fastener 240 and the inner surface of the piston rod 220 may fasten, attach, and/or affix the toothed expansion fastener 240 and connector 12 to the piston rod 220 (for example, moveable element).

A load applied to the toothed expansion fastener may be a torque or twisting load applied to the socket element 256. A torque may be applied to the socket element 256 by, for example, a hex wrench or other device (as discussed below in FIG. 10). The torque applied to the socket element 256 may cause the threaded element 250 to translate within a threaded hole of the slotted nut 244. As the threaded element 250 translates into the threaded hole of the slotted nut 244, the expansion cone element 248 may translate and/or be pulled toward the slotted nut 244 and one or more toothed arm elements 242. The translation of the cone element 248 which is in contact with one or more of the toothed arm elements 242 may force the toothed arm elements 242 outwardly away from the central axis 258 of the toothed expansion fastener. Forcing the toothed arm elements 242 outward may cause the toothed arm elements 242 to engage, grip, contact, and/or substantially contact the inner surface of the piston rod bore hole 224. The engagement between the toothed arm elements 242 and the piston rod bore 224 may attach the tooth expansion fastener 240 and the connector 12 to the moveable element 220 (for example, the piston rod).

In some aspects, the thrust washer 252 (for example, a Teflon thrust washer), compression spring in the toothed expansion fastener body 256, and other components in toothed expansion fastener 240 may dampen and/or decrease loads applied to the attachment between the toothed expansion arms 242 and the piston rod bore 224. By way of example, translation of a moveable element (for example, piston rod 220) may apply a load to the engagement between the toothed arm elements 242 and the piston bore hole 224. The thrust washer 252, compression spring, and other components may absorb and reduce load applied to the contact between the toothed arm elements and the piston bore hole 224.

In some aspects, the piston rod 220 may include a magnet element 226. The connector attachment element 240 may include a magnetic attachment element 260. The magnetic attachment element 260 may be, for example, a ferrous ring, collar and/or other similar element. As depicted in FIG. 7, the connector attachment element 240 may, in some aspects, include a magnetic element 260 in conjunction with other fastening elements (for example, a toothed expansion fastener, a leaf-spring fastener, a spring-loaded detent) to affix the connector 12 to a moveable element 220. A magnetic force between the magnetic attachment element 260 and magnetic element 226 of the piston rod 220 may, for example, position and/or align the connector 12 relative to the moveable element 220.

Figure 8:
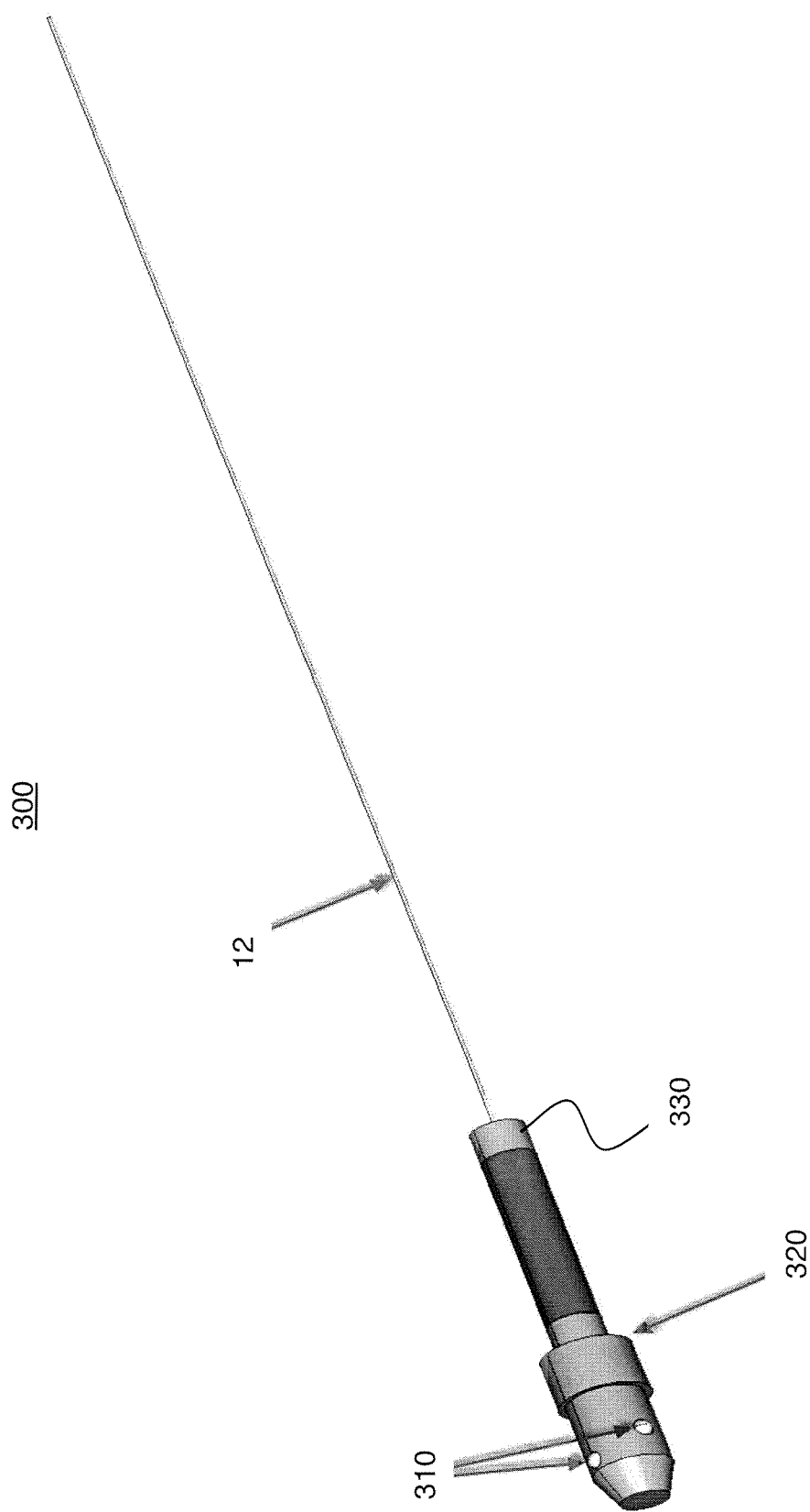
FIG. 8 depicts a spring-loaded ball detent connector attachment element of a linear position sensing system according to aspects of the present disclosure.

FIG. 8 depicts a spring-loaded ball detent connector attachment element 300 of a linear position sensing system according to aspects of the present disclosure. The spring-loaded detent device 300 may include one or more spring loaded ball detents 310, a magnetic attachment element 320, and other components. The spring-loaded detent device 300 may be attached to the connector 12 of the sensor as illustrated in FIG. 1.

The spring-loaded detent device 300 may be attached to a moveable element of an external device 110 as depicted in FIG. 4. The spring-loaded detent device 300 may, for example, be inserted into a bore of a moveable element (for example, the moveable element 112 of FIG. 4). Upon insertion, the one or more spring loaded ball detents 310 may engage the walls of a moveable element bore hole of the moveable element 112. The bore of the movable element may, in some aspect, include one or more holes, depressions, and/or grooves to accommodate the one or more ball detents, thereby engaging the spring-loaded detent device 300 to the moveable element. The magnetic attachment element 320 may, additionally, engage a magnetic element of the external device 110 and/or the moveable element 112 to further align the detent device 300.

Figure 9:
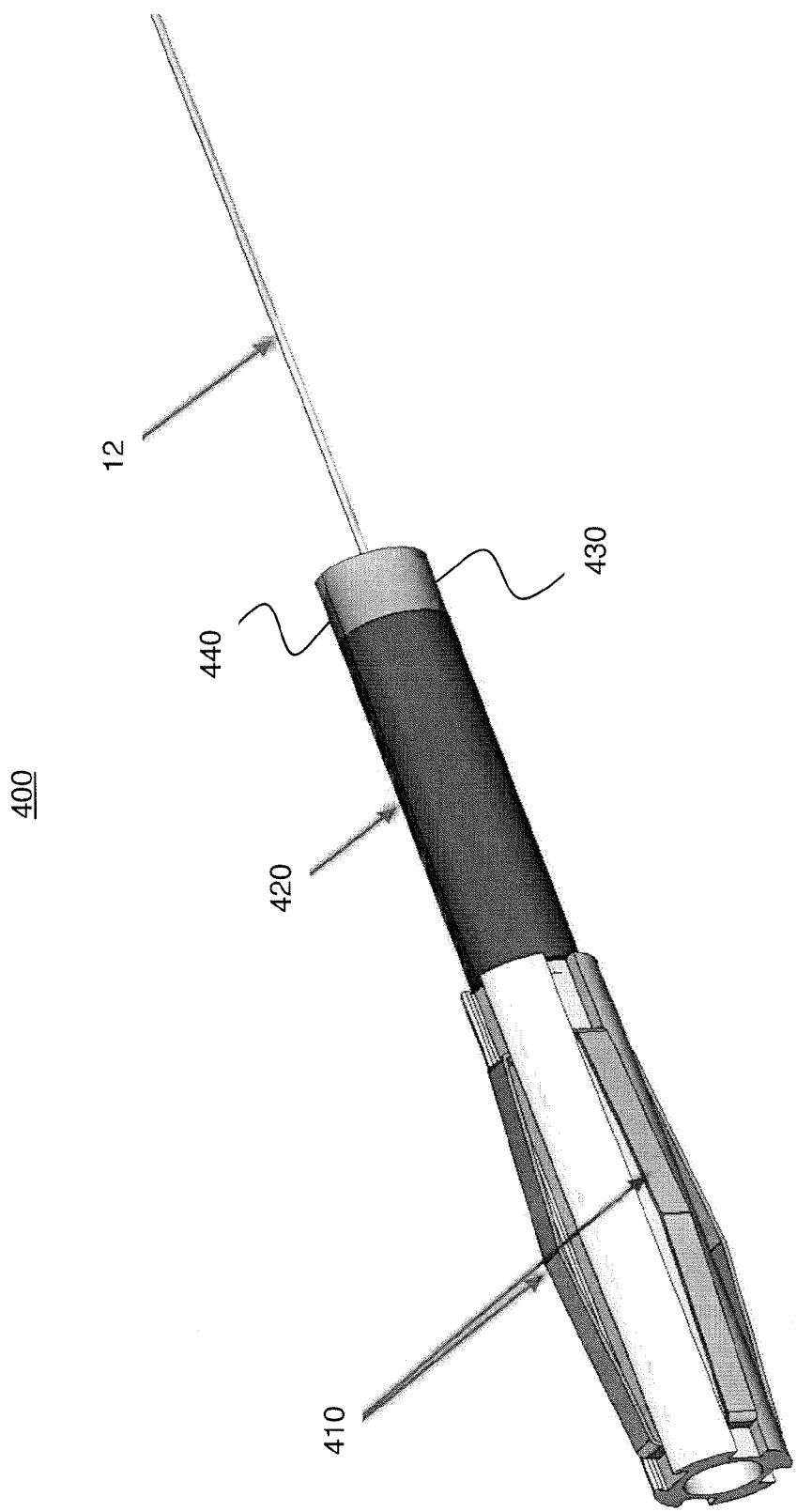
FIG. 9 depicts a leaf spring connector attachment element of a linear position sensing system according to aspects of the present disclosure.

FIG. 9 depicts a leaf spring connector attachment element of a linear position sensing system according to aspects of the present disclosure. A connector attachment element may, in some aspects, be a leaf spring fastening device 400. The leaf spring fastening device 400 may include one or more leaf springs 410, a shock absorber element 420, a magnetic attachment element 430, a socket element 440, and other components. Similar to the spring-loaded device 300 of FIG. 8, the leaf spring attachment device 400 may be attached to the connector 12 of the sensor 10 of FIG. 1.

Figure 10:
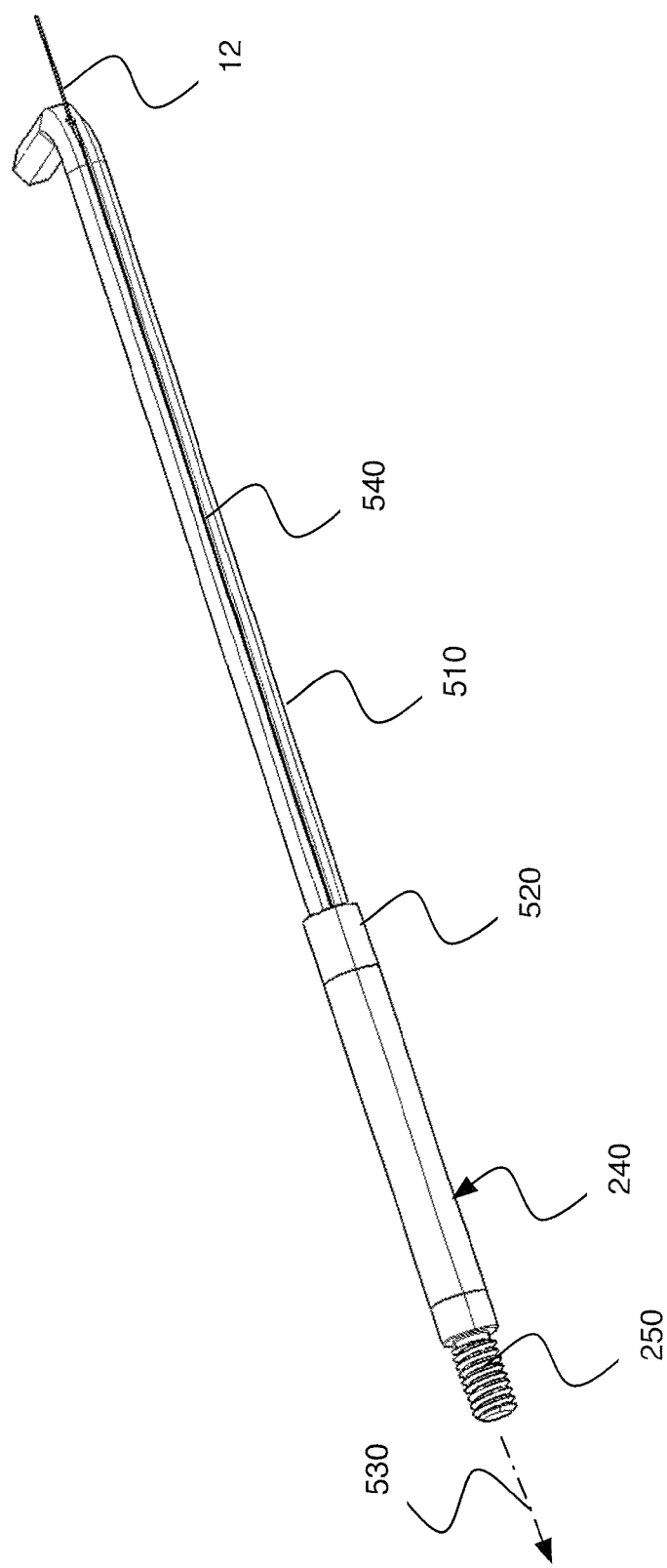
FIG. 10 depicts a hex wrench, socket element and other components of a connector attachment element according to aspects of the present disclosure.

The leaf spring attachment device 400 may be attached to a moveable element of an external device 110 as depicted in, for example, FIG. 4. The leaf spring attachment device 400 may, for example, be inserted into a bore hole of a moveable element 112 of FIG. 4. Upon insertion, the one or more leaf springs 410 may engage the walls of a bore hole of the moveable element 112. A socket element 440 may be used to engage or increase a strength of engagement of the one or more leaf springs 410 to the walls of a moveable element bore hole. A torque or twisting load applied to the socket element 440 by, for example, a wrench device (as depicted in FIG. 10) may force the leaf springs outward toward the walls of the bore hole, thereby engaging the walls of the bore hole. The magnetic attachment element 430 may, additionally, engage a magnetic element of the moveable element. A shock absorber element 420 may reduce the amount of load applied to the engagement between the one or more leaf springs 410 and the bore walls during use of the linear position sensing system 100.

FIG. 10 depicts a wrench device, socket element, and other components of a connector attachment element according to aspects of the present disclosure. A wrench device 510 may be, for example, a hex wrench, hex key, socket wrench, square head wrench, torque wrench, or any other type of wrench or other suitable device. The wrench device 510 may, optionally, be used to engage a connector attachment element 240 to, for example, a hole in a moveable element (for example, a piston rod). A wrench device 510 may similarly be used to position and/or align a connector attachment element 240 in a hole in the moveable element. Engaging a connector attachment element 240 to a moveable element of an external device using a wrench device 510 may allow the connector attachment element 240 and linear position sensing system 100 to be affixed to the external device (for example, external device 110 of FIG. 4 or external device 210 of FIG. 5) without disassembling the external device.

By way of example, a connector attachment element 240, for example, a toothed expansion fastener (for example, shown in FIG. 7), a leaf-spring attachment device (for example, shown in FIG. 9), or other attachment element may include a socket element 520. A torque and/or twist may be applied to the socket element 520 by, for example, a wrench device 510 or other device. The torque applied to the socket element 520 may cause elements of the connector attachment element 240 to translate in a first direction 530. A threaded element 250 of the connector attachment element 240 may, for example, translate in a first direction 530. The threaded element 250 may, for example, translate in a first direction in a threaded hole of the slotted nut (not shown) or other element. The translation of the threaded element 250 may cause a components of the connector attachment element 240 to engage a hole in a moveable element. For example, the translation of the threaded element 250 in a toothed expansion fastener may engage toothed arms of the expansion fastener to a bore hole (for example, piston rod) in an external device. Similarly, translation of components (for example, a threaded element) in a leaf-spring device may engage one or more leaf springs to the bore hole in the moveable element.

In some aspects, a wrench device 510 may be used to align and/or position a spring-loaded ball detent device (for example, as shown in FIG. 8) within a moveable element. For example, the wrench device 510 may be used to push the ball detent device into a bore hole in the moveable element. The wrench device 510 may also be used to rotate and otherwise align the ball detent device within the bore hole.

In some aspects, the wrench device 510 may include a slot and/or groove 540 along a longitudinal portion of the wrench device 510. The slot and/or groove 540 may accommodate the connector 12, which extends through at least a portion of the socket element 520 and/or the connector attachment element 240. The slot and/or groove 540 in the wrench device 510 may, for example, allow the wrench device 510 to apply a load to the connector attachment element 240 without interfering with the attachment between the connector 12 and the connector attachment element 240.

At this point, while we have discussed and described the disclosure using some specific examples, those skilled in the art will recognize that our teachings are not so limited. Accordingly, the disclosure should be only limited by the scope of the claims attached hereto.

The invention claimed is:

1. A linear position sensing system, comprising:
   a sensor including a connector and a converting element, where the connector includes a first end attached to the converting element and a second end configured for attachment to a moveable element of an external device;
   an enclosure, where the enclosure houses at least a portion of the sensor; and
   a conduit including:
   an inner element;
   an outer element;
   a conduit first end attached to the enclosure; and
   a conduit second end fitting operable to affix the conduit to the external device;
   wherein the connector passes through the inner element of the conduit
   and is in substantial contact with an interior surface of the inner element.

2. The system of claim 1, wherein:
   the sensor comprises a draw-wire sensor;
   the connector comprises a draw-wire; and
   the sensor converting element is housed entirely within the enclosure.

3. The system of claim 1, wherein the outer element of the conduit comprises an element selected from the group consisting of a flexible substantially cylindrical element and a rigid substantially cylindrical element.

4. The system of claim 1, wherein:
   the conduit first end fitting includes a first fastening element for fastening the conduit first end fitting to the enclosure, the first fastening element selected from the group consisting of a threaded fastener, a flange, a weldment, and a magnetic fastener; and
   the conduit second end fitting includes a second fastening element for fastening the conduit second end fitting to an external device, the second fastening element selected from one or more of the group consisting of a threaded fastener, a flange, a weldment, a clip, a clamp, and a magnetic fastener.

5. The system of claim 1, wherein the connector second end is attached to the moveable element with one or more fastening elements selected from the group consisting of a threaded attachment, a magnet, a spring clip, an adhesive, a spring-loaded detent, a toothed expansion fastener, and a leaf-spring.

6. The system of claim 1, wherein the interior surface of the conduit inner element comprises an element selected from the group consisting of Teflon, fluorinated ethylene propylene (FEP), ultra-high-molecular-weight (UHMW) polymers, a flouropolymer, silicate surface coating, and polished metal.

7. The system of claim 1, wherein the enclosure and the conduit are substantially filled with a non-combustible liquid.

8. The system of claim 1, wherein the enclosure and the conduit are sealably attached to one another such that the enclosure and the conduit are operable to contain a gas or liquid at a substantially higher pressure than ambient when the conduit second end fitting is affixed to the external device.

9. The system of claim 1, wherein the conduit second end fitting is attachable to a fitting selected from the group consisting of a gas charge fitting, a high-pressure fuse fitting, and a pressure sensor fitting.

10. The system of claim 1, wherein a difference between an outer diameter of the connector and inner diameter of the inner element is sufficiently large to allow fluid flow through conduit.

11. The system of claim 1, wherein the connector comprises a flexible connector selected from the group consisting of a metal cable, Kevlar cable, draw-wire, and nylon cable.

12. A method of manufacturing a position sensing system, comprising the steps of:
    providing an external device;
    providing a linear position sensing system comprising:
    a sensor including a connector and a converting element, where the connector includes a first end attached to the converting element and a second end;
    a connector attachment element, where the connector attachment element is affixed to the second end of the connector;
    an enclosure, where the enclosure houses at least a portion of the sensor; and
    a conduit including
    a conduit first end attached to the enclosure and
    a conduit second end fitting,
    wherein the connector passes through the conduit;
    affixing the conduit to the external device via the conduit second end fitting; and
    attaching the connector to a movable element within the external device via the connector attachment element, the attaching step further including,
    inserting the connector attachment element into a bore hole in the moveable element; and
    engaging one or more fastening elements of the connector attachment element with an inner surface of the bore hole of the moveable element.

13. The method of claim 12, wherein the connector attachment element comprises a combination of one or more connectors selected from the group consisting of a threaded attachment, a magnet, a spring clip, a ferrous element operable to attach to a magnet, an adhesive, a spring-loaded detent device, a toothed expansion fastener, and a leaf spring device.

14. The method of claim 12, wherein the conduit second end fitting is selected from one or more of the group consisting of a threaded fastener, a flange, a weldment, a clip, a clamp, and a magnetic fastener.

15. The method of claim 12, wherein the first providing step includes removing a probe-type sensor from the external device.

16. The method of claim 12, wherein the external device comprises a device selected from the group consisting of a hydraulic energy storage device and a hydraulic actuator.

17. The method of claim 12, where the engaging step comprises engaging a magnetic attachment element of connector attachment element to a magnetic element of external device.

18. The method of claim 12, wherein:
  the connector attachment element comprises a toothed expansion fastener, the toothed expansion fastener including at least:
  one or more toothed arms,
  an expansion cone,
  a socket element; and
  the engaging step comprises:
    applying a load to the socket element, wherein applying a load to the socket element translates the expansion cone towards the one or more toothed arms causing the toothed arms to engage a surface of the moveable element.

* * * * *